United States Patent [19]
Daly et al.

[11] 4,071,887
[45] Jan. 31, 1978

[54] SYNCHRONOUS SERIAL DATA ADAPTOR

[75] Inventors: Thomas C. Daly, Phoenix, Ariz.; Edward C. Hepworth, Chattanooga, Tenn.; Rodney J. Means, Manassas, Va.

[73] Assignee: Motorola, Inc., Schaumburg, Ill.

[21] Appl. No.: 627,180

[22] Filed: Oct. 30, 1975

[51] Int. Cl.² ............................ G06F 3/00; H04J 3/00
[52] U.S. Cl. ............................... 364/200; 340/147 R; 179/15 BA
[58] Field of Search .................. 340/172.5; 445/1; 179/15 AL, 15 BA, 15 BS, 15 BV; 364/200, 900

[56] References Cited

U.S. PATENT DOCUMENTS

| | | | |
|---|---|---|---|
| 3,310,626 | 3/1967 | Cassidy, Jr. | 179/15 BA |
| 3,400,375 | 9/1968 | Bowling et al. | 340/172.5 |
| 3,419,849 | 12/1968 | Anderson et al. | 340/172.5 |
| 3,419,852 | 12/1968 | Marx et al. | 340/172.5 |
| 3,748,649 | 7/1973 | McEowen | 340/172.5 |
| 3,757,306 | 9/1973 | Boone | 340/172.5 |
| 3,771,134 | 11/1973 | Huettner et al. | 340/172.5 |
| 3,825,905 | 7/1974 | Allen, Jr. | 340/172.5 |
| 3,938,098 | 2/1976 | Garlic | 340/172.5 |
| 3,975,712 | 8/1976 | Hepworth et al. | 179/15 BA X |

Primary Examiner—Harvey E. Springborn
Attorney, Agent, or Firm—Joe E. Barbee

[57] ABSTRACT

An integrated circuit synchronous data adaptor (SSDA) provides a bidirectional interface for synchronous data interchange. Internal control and interface logic including first-in-first-out (FIFO) buffer memory enables simultaneous transmitting and receiving of standard synchronous communication characters to allow data transfer between serial data channels and the parallel bidirectional data bus of a bus organized system such as a microprocessor (MPU) system. Parallel data from the bus system is serially transmitted and received by the SSDA with synchronization character insertion and deletion, fill character insertion and deletion, parity generation and error checking. The functional configuration of the SSDA is programmed via the MPU system data bus during system initialization and can be reconfigured via program control during subsequent system operation. Programmable control registers provide control for variable word lengths, transmit control, receive control, synchronization control, and interrupt control. Status, timing and control lines provide peripheral unit or modem control.

22 Claims, 4 Drawing Figures

1

SYNCHRONOUS SERIAL DATA ADAPTOR

RELATED APPLICATIONS

This application is related to assignees copending U.S. patent application Ser. No. 519,138 "INTERFACE ADAPTOR ARCHITECTURE" (now abandoned), Ser. No. 519,150 "MICROPROCESSOR ARCHITECTURE" (now abandoned), and Ser. No. 519,149 "MICROPROCESSOR SYSTEM" by Bennett et al, all filed on Oct. 30, 1974 and to assignee's issued U.S. Pat. No. 3,975,712 by Hepworth et al.

BACKGROUND OF THE INVENTION

A large number of microprocessor systems are presently available. More recently, microprocessor systems utilizing bidirectional data buses have become available. A variety of digital circuits have been utilized to form the interface between such bidirectional data buses and the various peripheral devices controlled by and interacting with the microprocessor in the system. A particular category of peripheral devices incorporated in such systems are control and data storage devices which normally require the interchange of long serial blocks of data. In order to achieve maximum efficiency in such serial data transmission, synchronous transfer methods are often employed. In synchronous transmission, special characters or codes are transmitted and received as a preamble to a data message comprising a continuous stream of data characters with no delineation indicating the end of one character and the beginning of the next.

The overall area of application of serial synchronous data transmission can be generally divided into three subcategories;

1. Process control or numeric control applications within a local facility where a device in control by a microprocessor has a need to transmit or receive a stream of serial data. The most efficient way to accomplish this data transfer is to transmit and receive a long block of continuous characters. Typically this type of application makes use of signals transmitted over separate control channels to synchronize the transfer of the block of continuous characters.

2. Standard data communications involving transmission and reception over a MODEM (modulator-demodulator) arrangement which might be coupled to a telephone line. In this application dedicated lines or channels for control signals are impractical and synchronous transmission makes use of synchronization codes in the data stream to notify the destination of the data that a serial block of continuous characters is about to be transmitted.

3. Serial peripheral memory units such as tapes, disks or cassettes which have a relatively higher speed data transfer requirement. This category is a hybrid of (1) and (2) above in that it represents a data requirement within a local environment, for example, within a computer facility but it does not use special control lines per se to signal when blocks of data are being transmitted or received. Instead, these systems revert to the use of synchronization codes transmitted as a preamble to the actual block of data characters in order to synchronize the transmission data.

SUMMARY

Accordingly, it is an object of the present invention to provide low cost integrated circuit for synchronous serial data communication with a bidirectional data bus of a digital system.

It is another object of this invention to provide a synchronous serial data adaptor which incorporates first-in-first-out buffer memory to facilitate a higher speed data operation.

It is another object of this invention to provide a synchronous serial data adaptor which includes control registers for selecting the internal operating mode of the adaptor under program control.

It is another object of this invention to provide a synchronous serial data adaptor for data communication with a bidirectional data bus which includes a first control register for receiving data from the data bus in response to direct address selection and which contains additional registers for receiving data from the data bus in response to direct address selection combined with supplementary address code contained in the first control register.

It is another object of this invention to provide a synchronous serial data adaptor having a control section which detects synchronization codes defining the beginning of a serial data message which, under program control, will automatically strip the synchronization codes from the serial data message.

Briefly described, the present invention is a digital system for the synchronous transfer of data between serial data channels in a mircoprocessor system having a bidirectional parallel data bus. The invention includes a transmitting section which incorporates a first-in-first-out memory by which parallel data is reformatted and transmitted in serial form. The invention also includes a receiver section incorporating a first-in-first-out memory which receives serial data and reformats this data in parallel form. Additional control logic inserts or deletes synchronization codes and performs error checking under program control.

DETAILED DESCRIPTION

Figure 1A:
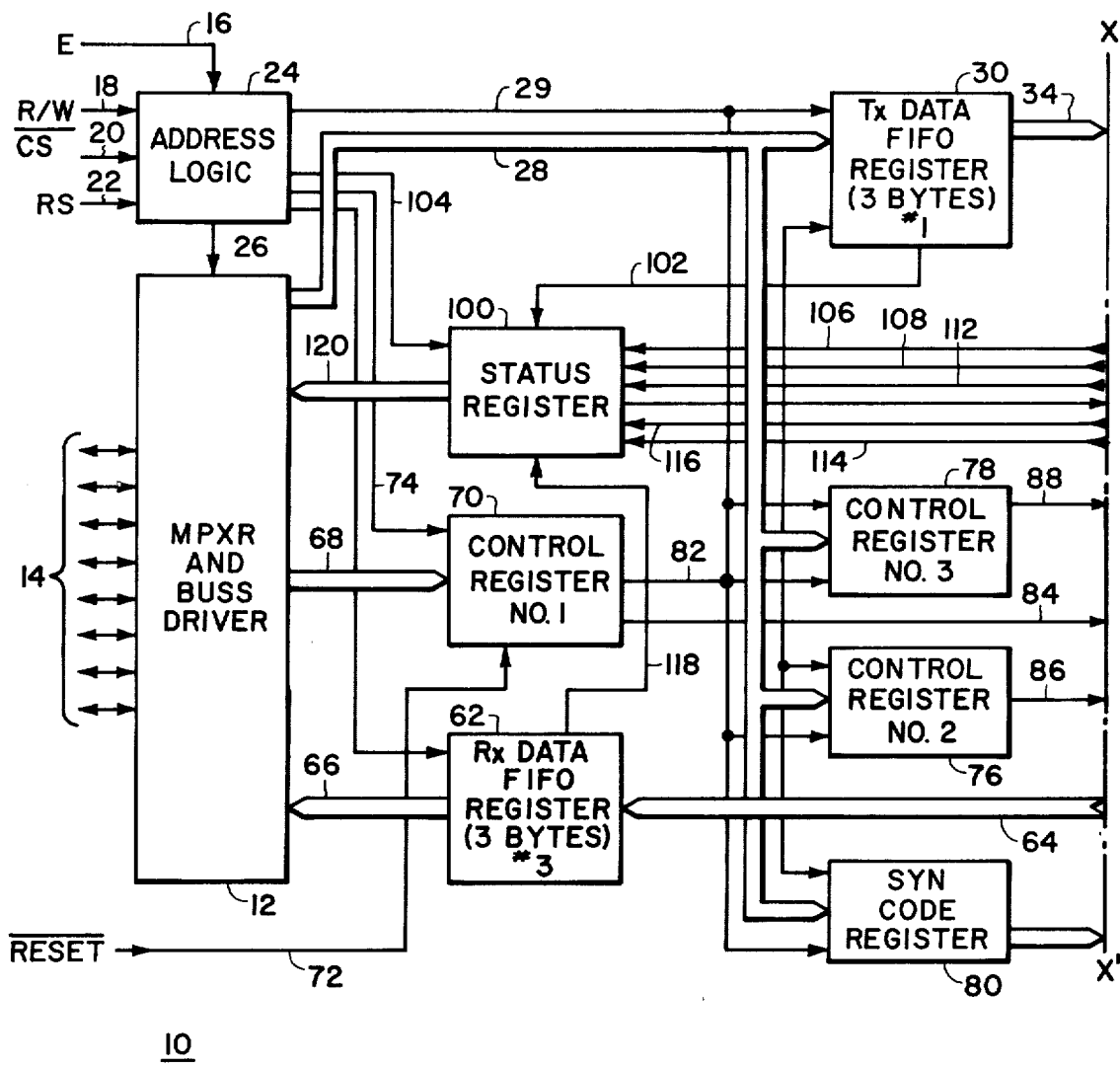
FIG. 1A and FIG. 1B show block diagram of a synchronous serial data adaptor according to a presently preferred embodiment of the invention partitioned along a section line X-X'. For convenience of discussion, this block diagram is called FIG. 1 in the detailed description which follows.
Figure 1B:
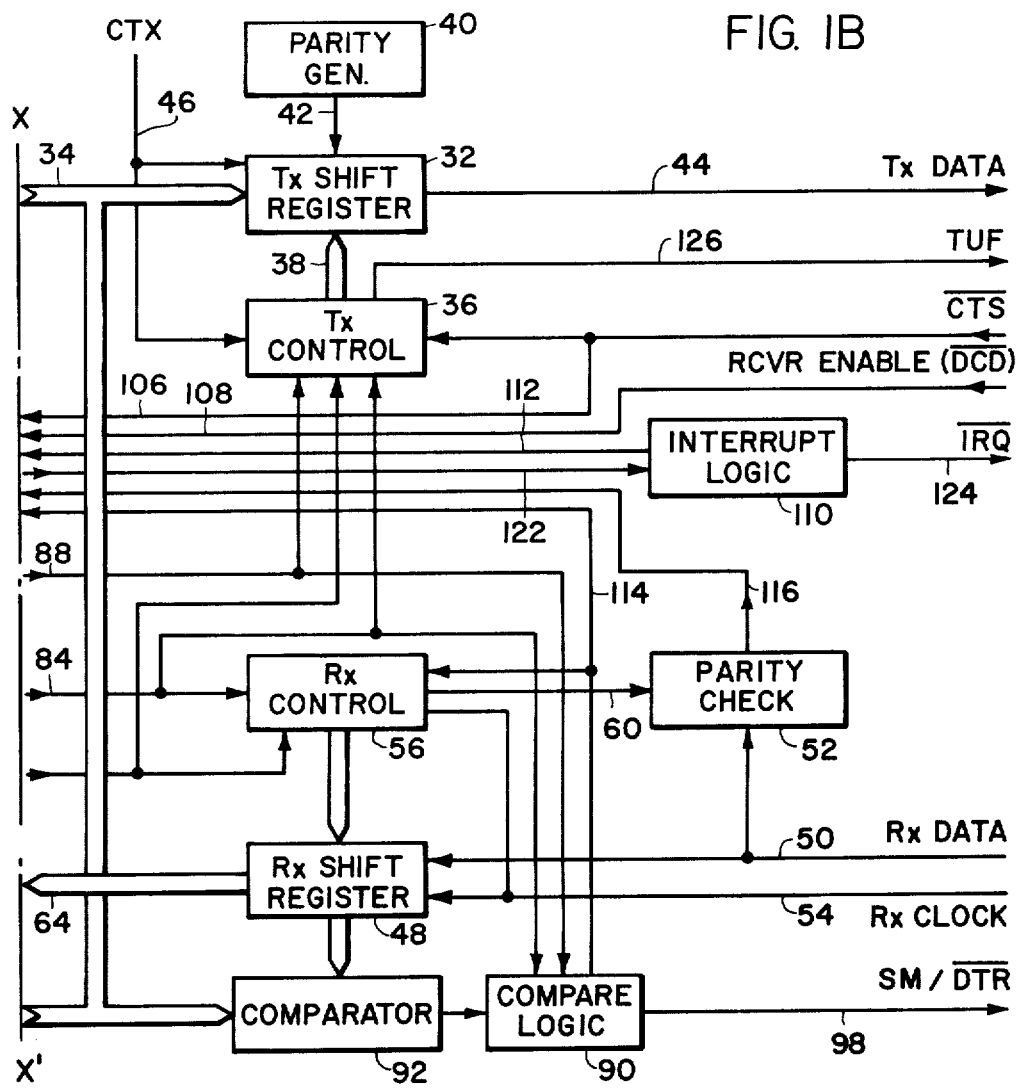

FIG. 1 is a block diagram of a synchronous serial data adaptor (SSDA) 10 according to the invention which in the preferred embodiment is implemented as a single integrated circuit chip. SSDA 10 has 8 bidirectional data input/output lines forming a bidirectional data bus 14 connected to multiplexer (MPXR) bus driver circuitry 12. Enable (E) input 16, read/write (R/W) input 18, chip select (CS) input 20 and register select (RS) input 22 are all connected to address logic circuitry 24 which is coupled to multiplexer bus driver circuitry 12 (referred to hereinafter as buffer circuitry 12) by means of one or more connections 26. In FIG. 1 the arrows indicate the direction of signal or data flow to or from a particular block of circuitry. Some of the solid lines be to be understood to represent a single conductor while others may represent a plurality of separate conductors. The wide coupling elements such as 28, 34, 38, 5, etc. represent buses which may include, for example, eight conductors for a one byte word system. The pointed ends of the buses indicate the direction of data flow and the same general format exists as when data is received or driven by bidirectional data bus 14.

Data to be transmitted from the SSDA 10 to an associated peripheral is transmitted via internal bus 28 which couples to transmitting data FIFO register 30 hereafter referred to as TX FIFO 30). TX FIFO 30 provides storage for three eight bit data words for three bytes" of data. The output of TX FIFO 30 couples to transmitting (TX) shift register 32 via internal bus 34. TX shift register 32 formats data words received in parallel in accordance with control information received from TX control circuit 36 via internal bus 38. Even or odd parity is generated by parity generator circuit 40 which couples to TX shift register 32 via conductor 42 and the resulting serial data word is transmitted via TX data output 44. The formatting and transmission of the serial data word is performed in synchronization with the transmitting clock signal (CTX) applied via input 46.

Received data is coupled to receiving (RX) shift register 48 via RX data conductor 50 which also couples to parity check circuit 52. RX clock conductor 54 which couples to RX shift register circuit 48 and RX control circuit 56 provides the basic timing for data reception. The output of RX control 56 couples to RX shift register 48 via internal bus 58 and to an input to parity check 52 via conductor 60. The output of RX shift register 48 couples to receiving data FIFO register 62 via (hereafter referred to as RX FIFO 62) internal bus 64. The output of RX FIFO 62 couples to buffer circuitry 12 via internal bus 66 which thus allows transmission of received data to the associated MPU via bidirectional data bus 14.

SSDA 10 contains three write only control registers which define modes of operation for the circuit. Internal bus 68 which couples to buffer circuit 12 provides the data inputs to control register #1, 70. Control register #1, 70, also has a $\overline{\text{RESET}}$ input applied via conductor 72 and an input from address logic 24 applied via conductor 74. One output of control register #1, 70, couples to control register #2, 76, control register #3, 78, TX FIFO 30 and synchronization code register 80 via conductor 82. Another output of control register #1, 70, connects to TX control circuit 36 and RX control circuit 56 via conductor 84. Control register #2, 76, control register #3, 78, and sync code register 80 all have data inputs via internal bus 28 and address inputs via conductor 29. The output of control register #2 connects to RX control circuit 56 and TX control circuit 36 via conductor 86. The output of control register #3, 78, connects to TX control circuit 36 and RX control circuit 56 via conductor 88 which also couples to an input of compare logic 90. Compare logic 90 as additional input via conductor 84 from control register #1 and an input from comparator 92 via conductor 94. Comparator 92 compares the contents of sync code register 80 via data inputs on internal bus 34 and the contents of RX shift register circuit 48 via data on internal bus 96. The output of compare logic circuit 90 is transmitted via conductor 98 which is the synchronization match/data terminal ready ($\text{SM}/\overline{\text{DTR}}$) output of SSDA circuit 10. Compare logic 90 also has an input from control register #1 via conductor 84 and an input coupled to control register #3, 78, via conductor 88. Status register 100 has an input from TX FIFO 30 via conductor 102, an input from address logic 24 via conductor 104, an input from TX control logic 36 via conductor 106, an input from conductor 108 which is the receiver enable ($\overline{\text{DCD}}$) input to SSDA 10, and an input from interrupt logic 110 via conductor 112. Status register circuit 100 also has an input from compare logic 90 via conductor 114 which also connects to RX control circuit 56, an input from parity check circuit 52 via conductor 116 and an input from RX FIFO 62 via conductor 118. The output of status register 100 is internal bus 120 which couples to buffer circuit 12. Interrupt logic 110 has an input from status register 100 via conductor 122 and produces an output via output conductor 124 which is the interrupt request via output conductor 124 which is the interrupt request output ($\overline{\text{IRQ}}$) output of SSDA 10. TX control circuit 36 has a transmit inhibit ($\overline{\text{CTS}}$) input via conductor 106 which also couples to status register 100 as well as inputs from control register #1, 70, via conductor 84, control register #2, 76, via conductor 86 and control register #3, 78, via conductor 88. The output of transmitting control circuit 36 couples to transmitting shift register circuit 32 via internal bus 38 and to the transmitter underflow (TUF) output of SSDA 10 via conductor 126.

Figure 2:
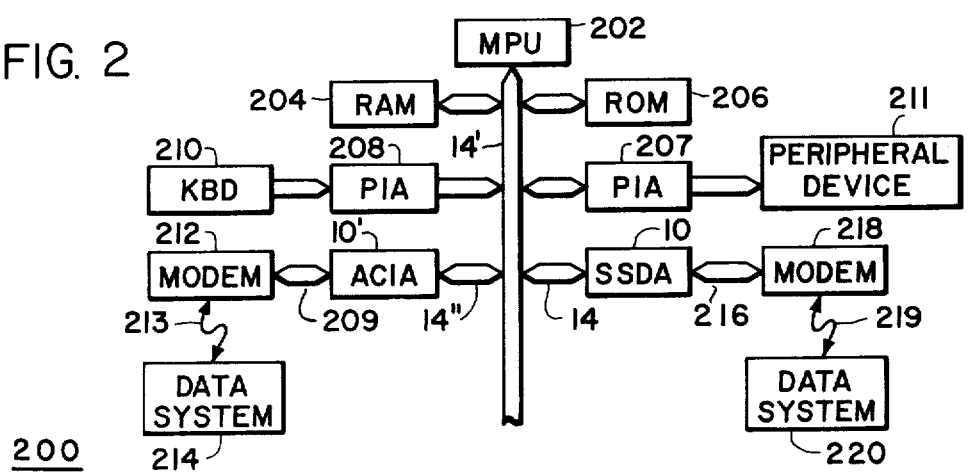
FIG. 2 is a block diagram of a microprocessor system in which the synchronous serial data adaptor of FIG. 1 may be utilized.

FIG. 2 is a block diagram of a typical microcomputer system in which the presently preferred embodiment of the serial synchronous data adaptor may be utilized. Microcomputer system 200 includes microprocessor chip 202, which may be described in the above mentioned patent application Ser. No. 519,150. Microprocessor circuit 202 is connected to a bidirection data bus 14'. Random access memory (RAM) 204 and read only memory (ROM) 206 are connected, respectively, by means of their data bus lines to the data conductors which constitute bidirectional data bus 14'. A plurality of peripheral interface adaptor (PIA) circuits such as 207 and 208 in FIG. 2 are connected by means of their bidirectional data input output conductors to their respective conductors of data bus 14'. An exemplary PIA circuit is described in detail in copending patent application Ser. No. 519,138 mentioned above. A PIA circuit such as circuit 208 may be utilized to couple peripheral devices such as keyboard 210 to data bus 14' to allow microprocessor 202 to communicate therewith. PIA circuits may also be used to couple other peripheral devices such as teletypes, cathode ray tubes, control panels, cassettes, etc. designated in FIG. 2 by reference number 209 to bidirectional bus 14'.

FIG. 2 also includes an asynchronous communications interface adaptor (ACIA) chip 10' of the type described in U.S. Pat. No. 3,975,712 mentioned above. ACIA chip 10' couples to modem 212 via bidirectional data coupling 209 to provide asynchronous communications with data system 214.

FIG. 2 also shows that SSDA 10, may be connected by means of data bus 14 to microcomputer data bus 14'. SSDA 10 couples to modem 218 via conductors 216 with modem 218 coupling in turn to a peripheral data system 220 thus allowing SSDA 10 to perform the functions of receiving data, transmitting data and performing modem control.

MODE OF OPERATION

General

The operation of SSDA 10 will now be described in terms of the functional interrelationship of the elements shown in the block diagram of FIG. 1. At the interface of data bus 14, the SSDA 10 appears as two addressable memory locations. Internally, SSDA 10 comprises 7 registers, two of which are read only and 5 of which are write only registers. The read only registers are status register 100 and receive data register 62 which is a FIFO register of three data byte capacity. The write only registers are control register #1, 70, control register #2, 76, control register #3, 78, sync code register 80 and TX data register 30. TX data register 30 is a FIFO register with a three byte data capacity. The serial interface of SSDA 10 comprises TX shift register 32, RX shift register 48, serial input and output lines with independent clocks, peripheral and modem control lines and associated logic. Additional information on FIFO registers is provided in Assignee's copending U.S. patent application Ser. No. 580,634 "FIRST-IN-FIRST-OUT REGISTER IMPLEMENTED WITH SINGLE RANK STORAGE ELEMENTS" By Hepworth et al filed on May 27, 1975.

Initialization

During the power on sequence, SSDA 10 is reset by means of RESET input 72 and is internally latched in the reset condition via bits 0 and 1 of control register #1 to prevent erroneous output transitions. The sync code register, control register #2 and control register #3 should be programmed prior to the release of reset. The reset is released by clearing the control bits in control register #1.

Data Transmission

Data is transferred to the transmitter section of SSDA 10 in parallel form by means of TX data FIFO register 30. The Tx data FIFO is a three byte register whose status is indicated by the transmitter data available (TDRA) status bit of status register 100 and its associated interrupt. Two data transfer modes are provided in SSDA chip 10, "one byte transfer mode" provides data to the transmitter section (and reading data from the receiver section) one byte at a time. The operating procedure is to determine that TDRA is high and then write a data character into the TX data FIFO 30. This process is repeated until status bit TDRA no longer returns high. The "two byte transfer mode" provides for writing two data characters in succession without a second status read. The second character can be written into the FIFO after one clock pulse on the E clock input has occurred to cause the FIFO data to shift. The data moves through the FIFO to the last empty register location being clocked by the pulse on E input 16.

Data will automatically transfer from the last register location in TX data FIFO 30 (when it contains data) to the TX shift register 32 during the second half phase of the clock cycle of the previous character. The character being transferred to the transmitter for transmission is clocked into Tx shift register 32 by the transmitter clock (CTX). Parity (odd or even) can optionally be automatically appended to the character being transmitted. The number of bytes in a character being transmitted is defined by bits 3, 4 and 5 of control register #2 as discussed below. The unused bit positions in short word length characters (including parity if applicable) are "don't cares." When the TX shift register becomes empty and data is not available for transfer from the TX data FIFO, an "under flow" is said to occur, and a character length of delay (an underflow character) is inserted into the transmitter data stream to maintain character synchronization. This is illustrated in schematic form in FIG. 3 where a synchronization character 308 has been inserted in data stream 300 to maintain synchronization. The "underflow" character (which is also called a "fill" character) to be transmitted will either be a "mark" (all bits equal logical "1") character or the contents of the sync code register depending upon the state of the "transmit sync code on underflow bit" in control register #2 as discussed below. Internal parity generation is inhibited during underflow except for sync code fill character transmission in the case of 8-bit plus parity word lengths. The underflow condition is indicated by a pulse on the TUF output conductor 126. This underflow output occurs coincident with transfer during the second half phase of the clock cycle of the last bit preceding the underflow character. In addition, the underflow status bit is set and remains set until cleared by means of the "clear underflow" control bit of control register #3.

Transmission is initiated by releasing the bus controlled transmitter reset bit (TXRs) in control register #1. When the TXRs bit is released, the first full positive half cycle of the transmitter clock (CTX) will initiate a transfer cycle. The transferred character will begin to be transmitted on the negative CTX transition which causes the transfer. If the Tx data FIFO 30 was not loaded during the Tx reset condition and two additional E clocks have not occurred, an underflow character will be transmitted.

The clear-to-send (CTS) input 106 provides for automatic control of serial character transmission in a system configuration such as the system embodiment of FIG. 12. In FIG. 2, data and control interconnections 216 would include a "clear-to-send" output from modem 218 which would connect to the CTS input 106 of SSDA 10. The CTS input at logical "1" would indicate that the modem 218 was not available for data transmission. The CTS input resets the transmitter section when high but does not reset the TX data FIFO. The TDRA status bit is inhibited by CTS being high in either the one sync code or two sync code modes of operation. In the parallel-to-serial mode (the operating mode which utilizes no internal synchronization), TDRA is unaffected by CTS in order to provide TX data FIFO status for preloading the transmitter and to operate under the control of the CTS input. When the TX reset bit of control register #1 is set, the TX data FIFO is cleared and the TDRA status bit is inhibited. After one E clock has occurred, the TX data FIFO becomes available for new data but TDRA remains inhibited. This feature allows for preloading transmit data (such as with sync codes) when the TX data FIFO status is known.

Receiving Data

Figure 3:
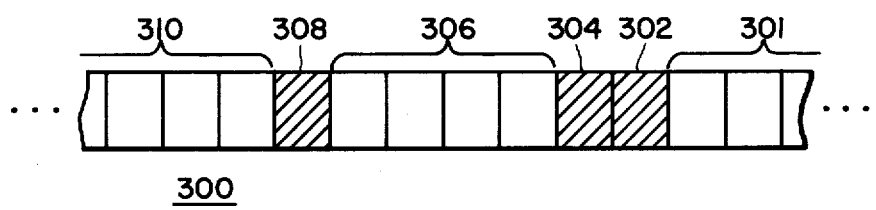
FIG. 3 is a diagram of a sequence of serial data words including synchronization codes as are used in synchronous data transmission and is useful in explaining the invention.

Referring to FIG. 1, data and a presynchronized clock are provided to the receiving section of SSDA 10 by means of the RX data input 50 and the RX clock input 54. Data is in a homogenous form (a continuous stream of binary data bits) without means for identifying characters within the stream. It is therefore necessary to chieve character synchronization at the beginning of the message block. FIG. 3 illustrates schematically a continuous stream of data characters 300 with synchronization characters 302 and 304 defining the beginning of a message block. When synchronization is achieved, it is assumed to be retained for all successive characters within the message block. Digital communication systems utilize the detection of predetermined reference characters known as "synchronization codes" during the initial portion of the preamble to establish character synchronization. This synchronization generally requires the detection of one synchronization code or of two successive synchronization codes. The schematic data stream 300 shown in FIG. 3 illustrates two successive synchronization codes 302 and 304.

Synchronization

The SSDA 10 provides three operating modes with respect to character synchronization. These are the one synchronization character mode and two synchronization character mode discussed previously and the parallel-to-serial mode. The parallel-to-serial mode requires external synchronization and control of the receiving section through the $\overline{DCD}$ input 108 (FIG. 1). This external synchronization could consist of direct line control from associated peripheral unit or from external detection of the occurrence of the beginning of the message block of data. In the one synchronization character mode of operation, internal logic of SSDA 10 compares on a bit by bit basis until a match is achieved between the data in RX shift register 48 and in synchronization code register 80. This match, as determined by comparator 92 which couples to compare logic 90, indicates that character synchronization is complete and the character reference will be retained for the message block. In the two synchronization character mode of operation the receiver searches for a first synchronization match on a bit by bit basis and then looks for a second successive synchronization code character prior to establishing character synchronization. If the second synchronization code character is not received, the bit by bit search is resumed from the first bit of the second character. In another mode of operation the synchronization code register 80 (FIG. 1) can be reloaded after the first code is detected to provide matching of a unique synchronization "code" which is two characters long (16 bits for the particular embodiment of FIG. 1). Timing for the loading of the second character can be derived from the $\overline{SM/DTR}$ output 98. Synchronization codes received prior to the completion of synchronization are not transferred to the RX data FIFO 62. Redundant synchronization codes during the preamble or synchronization codes which occur as "fill characters" within a sequence of data characters can be optionally stripped from the data using the "strip sync control bit" in control register #1 as described below. This option tends to minimize system loading. The character synchronization mode of operation will be retained until cleared by means of the "clear sync" bit in control register #1.

Receiver Operation

When synchronization has been achieved subsequent characters will automatically transfer to the RX data FIFO 62. The RX data FIFO 62 is clocked to give the timing pulse on E input 16 to cause received data to move through the FIFO to the last empty register location. Data will be transferred from RX data FIFO 62 to the system data bus 14 utilizing either the "1 byte transfer" or the "2 byte transfer" mode depending on the programming of control register #2. This transfer mode combined with the buffering action of RX data FIFO 62 provide one of the major advantages of the invention since a much higher note of data reception can be achieved. TX data FIFO 30 provides an analogous advantage for data transmission. The receiver data available status bit (RDA) indicates when data is present either in the last FIFO register location or in the last two FIFO register locations depending on the transfer mode programmed. Data being available in RX data FIFO 62 causes an interrupt to be initiated (assuming the receiver interrupt is enabled, RIE = logical "1" and the MPU chip 202 (FIG. 2) will then read the status register 100 of SSDA 10 as a result of the interrupt or in its turn in a polling sequence. The RDA status bit will indicate that receiver data is available and the MPU will subsequently read the RX data FIFO register 62. The interrupt and the RDA status bit will then be reset automatically. If more than one character had been received and was resident in RX data FIFO 62, subsequent clocks (Input 16) will cause the FIFO to update and the RDA status bit and interrupt will again be set. Parity is automatically checked as characters are received and parity errors are optionally available in status register 100 until the RX data FIFO 62 has been read. Parity errors will cause an interrupt on $\overline{IRQ}$ output 124 if the error interrupt enable bit has been set in control register #2. The parity bit is automatically set to 0 for short word length data being transferred to the MPU via the data bus.

Other status bits which pertain to the receiver section of SSDA 10 are overrun bit and the receiver inhibit bit ($\overline{DCD}$). The overrun status bit is automatically set when a transfer of a character to the RX data FIFO 62 occurs and the first word location of the FIFO is full. Overrun causes an interrupt if EIE has been set. The transfer of the overrunning character into the FIFO causes the previous character stored in the FIFO input register to be lost. Overrun is cleared by reading the status register 100 (when the overrun condition is present) and subsequently reading RX data FIFO 62. Overrun cannot occur and be cleared without providing opportunity to detect its occurrence via the status register 100. The $\overline{DCD}$ input going high causes an interrupt if the EIE control bit of control register number 2 has been set. The interrupt caused by $\overline{DCD}$ is cleared by reading the status register when the $\overline{DCD}$ status bit is high followed by an RX data FIFO read. The $\overline{DCD}$ status bit will subsequently follow the state of the $\overline{DCD}$ input until it goes high a second time.

INPUT/OUTPUT FUNCTIONS

The operation of the SSDA and in particular its operation in a microprocessor system environment such as shown in FIG. 2, is further explained by briefly summarizing the functions performed by each of the input and output connections to the SSDA as shown in FIG. 1.

SSDA INTERFACE SIGNALS FOR MPU

SSDA bidirectional data bus 14—these bidirectional data lines allow for data transfer between the SSDA and the MPU. In the preferred embodiment data bus output drivers are three state devices which can transmit logical 0, transmit logical 1, or remain in a high impedance (off) state which prevents interference with other MPU operations on the bus.

SSDA enable (E) 16—this input provides basic timing which enables the bus input/output data buffers and provides basic timing to clock data to and from the SSDA.

Read/write (R/W) 18—this input is used to control the direction of data flow to the SSDA. When R/W is high (MPU read cycle), SSDA output drivers 12 (FIG. 1) are turned on and a selected register is read. When R/W is low the SSDA output drivers are turned off and the MPU writes into a selected register. Therefore the R/W signal is used to select read-only or write-only registers within the SSDA.

Chip select ($\overline{CS}$) 20—this input is used to address the SSDA. The SSDA is selected when $\overline{CS}$ is low. Transfers of data to and from the SSDA chip are then performed on control of the E input, R/W input and register select.

Register select (RS) 22—a logic "1" on this input is used to select the TX data FIFO register 30 or the RX data FIFO register 62. A logic 0 on this input is used to select the control registers 70, 76, and 78, the status register 100 and the synchronization code register 80. The R/W input is used in conjunction with register select to select the read-only or write-only register in each register pair.

Interrupt request ($\overline{IRQ}$) 124—this output interrupts the MPU when at the logic 0 state and is arranged so that it may be connected in a "wire OR" configuration with similar request outputs from other chips in an MPU system. The $\overline{IRQ}$ output remains at a logic "0" as long as the cause of interrupt is present and the appropriate interrupt enable control bit within the SSDA chip is set.

Clock Inputs

Separate inputs are provided to the SSDA chip for the clocking of transmitted and received data:

Transmit clock (CTX) 46—the transmit clock input is used for the clocking of transmitter data. The transmitter initiates data on a negative transition of the clock.

Receive clock (CRX) 54—a receive clock input is used for the synchronization of receive data. The clock and the data (RX data input 50) must be synchronized externally. The receiver samples the data on the positive transition of the clock.

Serial Input/Output Lines

Receive data (RX data) 50—the receive data input provides the path through which data is received in serial format.

Transmit data (TX data) 44—the transmit data output transfers serial data to a modem or peripheral associated with the SSDA.

Peripheral/Modem Control

The SSDA includes several inputs and outputs that function to permit limited control of associated peripherals or modems.

Clear to send ($\overline{CTS}$) 106—the $\overline{CTS}$ input 106 provides a real time inhibit of the transmitter section which functions without disturbing the contents of the TX data FIFO 30. When the $\overline{CTS}$ input 106 is a logic "1," it inhibits the TDRA status and its associated interrupt in both synchronization modes of operation. TDRA bit of status register 100 is not affected by the CTS input 106 in the parallel to serial mode.

Data carrier detect ($\overline{DCD}$) 108—the $\overline{DCD}$ input also referred to as receiver enable, provides automatic control of the receiving end of the serial data system by means of system hardware. $\overline{DCD}$ input 108 at logic "1" inhibits the receiver section except for the RX data FIFO register 62 and its associated RDA status bit. The $\overline{DCD}$ input 108 going to logic "1" results in the storage of the event within the SSDA to insure the system recognizes its occurrence as a transient. The $\overline{DCD}$ input provides character synchronization timing for receiver data during parallel-to-serial operation. The receiver will be initialized and data will be sampled on a positive transition of the first full clock cycle of the receiver clock one bit time after the release of $\overline{DCD}$.

Sync Match/Data Terminal Ready (SM/$\overline{DTR}$) 98—The SM/$\overline{DTR}$ output 98 provides two additional functions which depend on the state of the PC1 and PC2 control bits (control register #2). When the sync match mode is selected, the output provides a one bit wide pulse when a sync code is detected.

Transmitter underflow (TUF) 126—the TUF output indicates the occurrence of a transfer of a "fill character" to the transmitter shift register 32 when the last register in TX data FIFO 30 is empty.

$\overline{RESET}$ 72—$\overline{RESET}$ input provides a means of resetting the SSDA from a hardware source. In the logic "0" (active) state the $\overline{RESET}$ input causes the following:

1. RX reset and TX reset (control register #1) are set causing both the receiver and transmitter section to be held in a reset condition.
2. PC Mode (control register #2) is selected and $\overline{PC}$ output is at logic "1."
3. A synchronization mode is selected (control register #3).
4. The TDRA status bit is inhibited (TDRA = logic "0").

When $\overline{RESET}$ returns to a logic "1" (the inactive state), the transmitter and receiver section will remain in the reset state until RX reset and TX reset are cleared via the bus under software control.

SSDA REGISTERS

Seven registers in the SSDA can be accessed by means of the data bus 14 (FIG. 1). The registers are defined as read-only or write-only according to the direction of information available. The register select (RS) input 22 selects two registers in each state, one being read-only and the other write-only. The read/write (R/W) input 18 defines which of the two selected registers will actually be accessed. Four registers (two read only and two write-only) can be addressed via the data bus at any particular time. The following truth table defines these registers and the required addressing. In this table, the notation C1b6 and C1b7 refers to the sixth and seventh bits of control register #1 respectively and the notation X refers to a "don't care" condition. It is important to note that bits 6 and 7 of control register #1 provide supplementary address codes which allow the indirect addressing of additional register under program control.

|  | R/W | RS | C1b6 | C1b7 |
| --- | --- | --- | --- | --- |
| Control Register #1 (write-only) | 0 | 0 | X | X |
| Status Register (read-only) | 1 | 0 | X | X |
| Control Register #2 (write-only) | 0 | 1 | 0 | 0 |
| Control Register #3 (write-only) | 0 | 1 | 1 | 0 |
| Sync Code Register (write-only) | 0 | 1 | 0 | 1 |
| Transmit Data Register (write-only) | 0 | 1 | 1 | 1 |
| Receiver Data Register (read-only) | 1 | 1 | X | X |

A summary of the operation of the SSDA as defined by the functional operation of its internal registers is provided by the following tables in which Table 1 provides a definition of directly addressed registers, Table 2 provides a definition of indirectly addressed registers and Table 3 provides additional details on the programming of the word length select bits provided in control register two in order to program various word length options for the SSDA.

In the heading of Table 1 a Boolean notation is used to define register address in terms of the logical state of the RS input 22 and the R/W input 18 (FIG. 1). For example, the notation RS · $\overline{R/W}$ indicates that the RS input is at a logical "1" level simultaneous with the R/W input at a logic "0" level. A similar notation is used in Table 2 to define register addresses in terms of bit 6 and bit 7 of control register #1. For example, the notation C1b6.$\overline{C1b7}$ indicates that in control register #1, bit 6 is at a logic "1" state and bit 7 is at a logic "0" state.

TABLE 1
DEFINITION OF DIRECTLY ADDRESSED REGISTERS

| Register Address | $\overline{RS} \cdot \overline{R/W}$ | $\overline{RS} \cdot R/W$ | $RS \cdot \overline{R/W}$ | $RS \cdot RW$ |
|---|---|---|---|---|
| Bus Line Number | (Write Only) | Receiver Data Register (Read Only) | Control Register Number 1 (Write Only) | Status Register (Read Only) |
| 0 | | Data Bit 0 | Rx Reset | Rx Data Avail. (RDA) |
| 1 | | Data Bit 1 | Tx Reset | Tx Data Reg. Avail. (TDRA) |
| 2 | (See Table 2) | Data Bit 2 | Strip RX Sync Char. | $\overline{DCD}$ |
| 3 | | Data Bit 3 | Clear Synchronization | $\overline{CTS}$ |
| 4 | | Data Bit 4 | Tx Interrupt Enable (TIE) | Underflow (unfl) |
| 5 | | Data Bit 5 | Rx Interrupt Enable (TIE) | Overrun (OVRN) |
| 6 | | Data Bit 6 | Address Control #1 (AC1) | Parity Error (PE) |
| 7 | | Data Bit 7 | Address Control #2 (AC2) | Interrupt Request (IRQ) |

TABLE 2
DEFINITION OF INDIRECTLY ADDRESSED REGISTERS

| Register Address | $\overline{C_1b_6} \cdot \overline{C_1b_7}$ | $C_1b_6 \cdot \overline{C_1b_7}$ | $\overline{C_1b_6} \cdot C_1b_7$ | $C_1b_6 \cdot C_1b_7$ |
|---|---|---|---|---|
| Register Name - Bus Line Number | Control Register #2 (Write Only) | Control Register #3 (Write Only) | Sync Code Register (Write Only) | Transmitter Data Register (Write Only) |
| 0 | PC1 | Parallel-to-Serial | Sync Bit 0 | Tx Data Bit 0 |
| 1 | PC2 | 1 Sync/2 Sync Mode | Sync Bit 1 | Tx Data Bit 1 |
| 2 | 1 Byte/2 Byte Transfer | Clear $\overline{CTS}$ | Sync Bit 2 | Tx Data Bit 2 |
| 3 | Word Sel #1 (WS1) | Clear Underflow | Sync Bit 3 | Tx Data Bit 3 |
| 4 | Word Sel #2 (WS2) | — | Sync Bit 4 | Tx Data Bit 4 |
| 5 | Word Sel #3 (WS3) | — | Sync Bit 5 | Tx Data Bit 5 |
| 6 | Tx Sync Code on Unfl | | Sync Bit 6 | Tx Data Bit 6 |
| 7 | Error Interrupt Enable (EIE) | — | Sync Bit 7 | Tx Data Bit 7 |

TABLE #3
WORD LENGTH SELECTION

| $WS_1$ | $WS_2$ | $WS_3$ | Word Length |
|---|---|---|---|
| 0 | 0 | 0 | 6 bits + Even Parity |
| 1 | 0 | 0 | 6 bits + Odd Parity |
| 0 | 1 | 0 | 7 bits No Parity |
| 1 | 1 | 0 | 8 bits No Parity |
| 0 | 0 | 1 | 7 bits Even Parity |
| 1 | 0 | 1 | 7 bits Odd Parity |
| 0 | 1 | 1 | 8 bits Even Parity |
| 1 | 1 | 1 | 8 bits Odd Parity |

What is claimed is:

1. A digital system for synchronous data communication comprising: (a) transmitter means coupled to a first serial data channel for transmitting data; (b) first memory means coupled to said transmitter means, said first memory means having first-in-first-out memories for sequentially buffering data which is to be transmitted by said transmitter means; (c) receiver means coupled to a second serial data channel for receiving data from said second serial data channel; (d) second memory means coupled to said receiver means, said second memory means having first-in-first-out memories for sequentially buffering data received by said receiver means; (e) control means coupled to said transmitter means and to said receiver means for selectively altering the structure of data transmitted on said first serial data channel and of data received on said second serial data channel and for synchronizing data received by said receiver means so as to insure the receipt of the beginning of a message; and (f) a bidirectional interface means coupled to an external bus and coupled to said first memory means, to said second memory means and to said control means for transferring data from said external bus to said first memory means and for transferring data to said external bus from said second memory means.

2. A digital system as set forth in claim 1 wherein said control means further comprises:
   a. address inputs;
   b. means responsive to signals on said address inputs for selecting a first control register to receive control information from said external bus; and
   c. means responsive to signals on said address inputs and responsive to said control information for selecting additional register means to receive additional information or data from said external bus.

3. A digital system as recited in claim 2 wherein said control means further comprises means for detecting synchronization codes defining the beginning and end of a message comprising serially received data characters.

4. The digital system recited in claim 3 wherein said control means further comprises means responsive to said means for detecting for automatically removing said synchronization codes from said serial data message.

5. The digital system as recited in claim 3 wherein:
   said additional register means further includes a synchronization code register selectively loaded from said external bus for storing a prescribed synchronization code; and
   further comprising comparator means for comparing said synchronization code to said received data characters for detecting a received synchronization code.

6. A digital system recited in claim 2 wherein said control means includes means for inserting a control code into a sequence of transmitted data characters.

7. The digital system as recited in claim 6 wherein said means for inserting includes control code selection means whereby said control code is selectively a synchronization code or a fill character.

8. The digital system recited in claim 6 further comprising:
   a. means for detecting the occurrence of underflow; and
   b. means responsive to said means for detecting the occurrence of underflow for producing an underflow indication;
   c. wherein said means for inserting inserts a control code into said sequence of transmitted data characters whenever underflow occurs.

9. A digital system as recited in claim 8 wherein said means for detecting the occurrence of underflow further includes an underflow output terminal coupled to an external unit and further comprising a transmitter clock signal coupled to said transmitter means and to said control means wherein an underflow output pulse occurs in synchronization with said transmitter clock signal on said underflow output terminal to allow synchronization of said external unit.

10. A digital system for synchronous data communication comprising: (a) transmitter means coupled to a first serial data channel for transmitting data; (b) first memory means coupled to said transmitter means; (c) receiver means coupled to a second serial data channel for receiving data from said second serial data channel; (d) second memory means coupled to said receiver means; (e) control means coupled to said transmitter means and to said receiver means for selectively altering the structure of data transmitted on said first serial data channel and of data received on said second serial data channel and for synchronizing data received by said receiver means so as to insure the receipt of the beginning of a message; (f) a bidirectional interface means coupled to an external bus and coupled to said first memory means, to said second memory means and to said control means for transferring data from said external bus to said first memory means and for transferring data to said external bus from said second memory means; and (g) a central processing unit coupled to said external bus, said central processing unit providing command signals at least for the first and second memory means; (h) said first memory means and said second memory means having first-in-first-out memories for sequentially buffering said data transmitted and said data received.

11. A digital system as set forth in claim 10 wherein said control means further comprises:
   a. address inputs;
   b. means responsive to signals on said address inputs for selecting a first control register to receive control information from said external bus; and
   c. means responsive to signals on said address inputs and responsive to said control information for selecting additional register means to receive additional information or data from said central processing unit via said external bus.

12. A digital system as recited in claim 11 wherein said control means further comprises means for detecting synchronization codes defining the beginning and end of a message comprising serially received data characters.

13. The digital system recited in claim 12 wherein said control means further comprises means responsive to said means for detecting for automatically removing said synchronization codes from said serial data message.

14. The digital system as recited in claim 12 wherein said additional register means further includes a synchronization code register selectively loaded from said external bus for storing a prescribed synchronization code; and
   further comprising comparator means for comparing said synchronization code to said received data characters for detecting a received synchronization code.

15. The digital system recited in claim 14 wherein said comparator means further includes a synchronization match output terminal coupled to said central processing unit for producing a signal indicating when said received data character and the contents of said synchronization code register are the same.

16. A digital system as recited in claim 11 wherein said additional register means further includes a status register for recording the internal operating status of the digital system, said status register readable by said central processing unit.

17. The digital system recited in claim 11 and further including interrupt control means for generating an interrupt request on an interrupt request terminal coupled to said central processing unit.

18. A digital system recited in claim 17 wherein said external bus comprises 8 bit lines for transferring bytes of parallel data and said second memory means is organized to store two or more bytes of parallel data.

19. The digital system recited in claim 18 wherein said interrupt control means generates an interrupt request on said interrupt request terminal when said second memory means has accumulated one or more bytes of parallel data.

20. The digital system recited in claim 19 wherein said interrupt control means is further responsive to control information stored in said additional register means whereby the number of data bytes in said second memory means required for generating an interrupt can be changed.

21. The digital system recited in claim 20 wherein said interrupt control means also generates an interrupt on said interrupt request terminal when said second memory means has accumulated two or more bytes of parallel data.

22. A digital system as recited in claim 11 further comprising a first and a second external synchronization input coupled to said control means and wherein said additional register means further includes control bit means for defining a parallel to serial or a serial to parallel operating mode wherein synchronization codes generated by the external synchronization inputs are ignored and a signal on said first external synchronization input synchronizes said transmitter means and a signal of said second external synchronization input synchronizes said receiver means.

* * * * *